July 17, 1923.
J. HALE
BROODER
Filed May 5, 1921
1,462,336
2 Sheets-Sheet 1
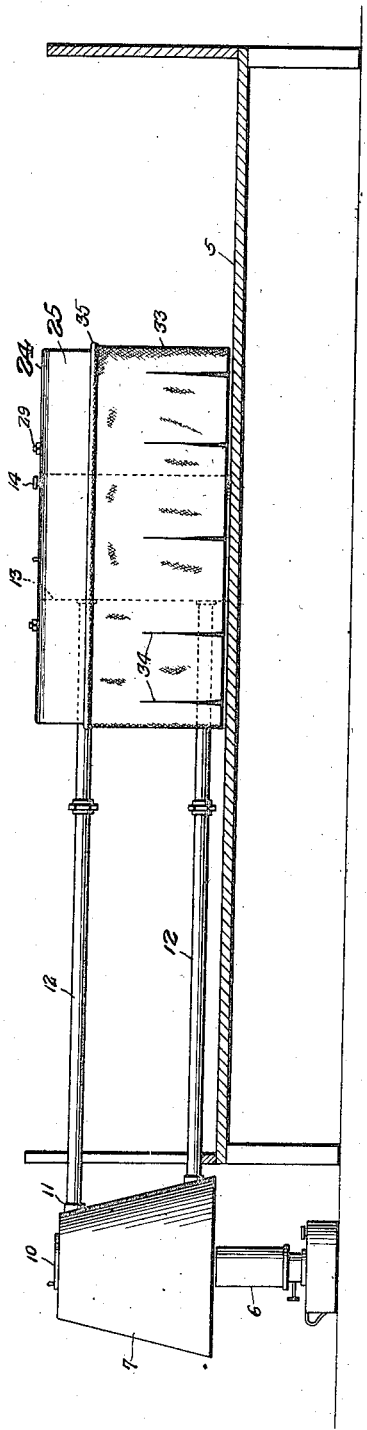
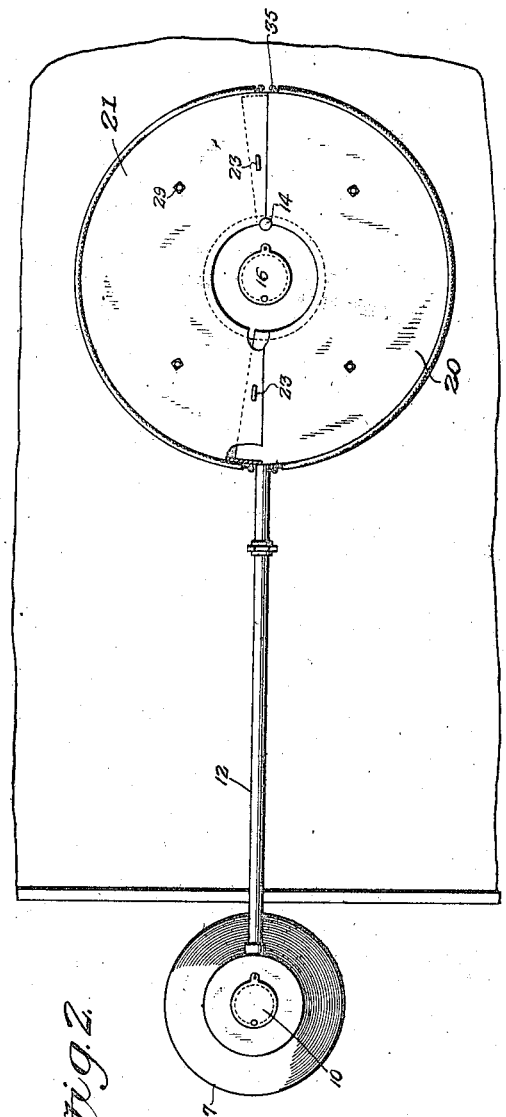
Inventor
John Hale,
By
Geo. P. Kimmel, Attorney

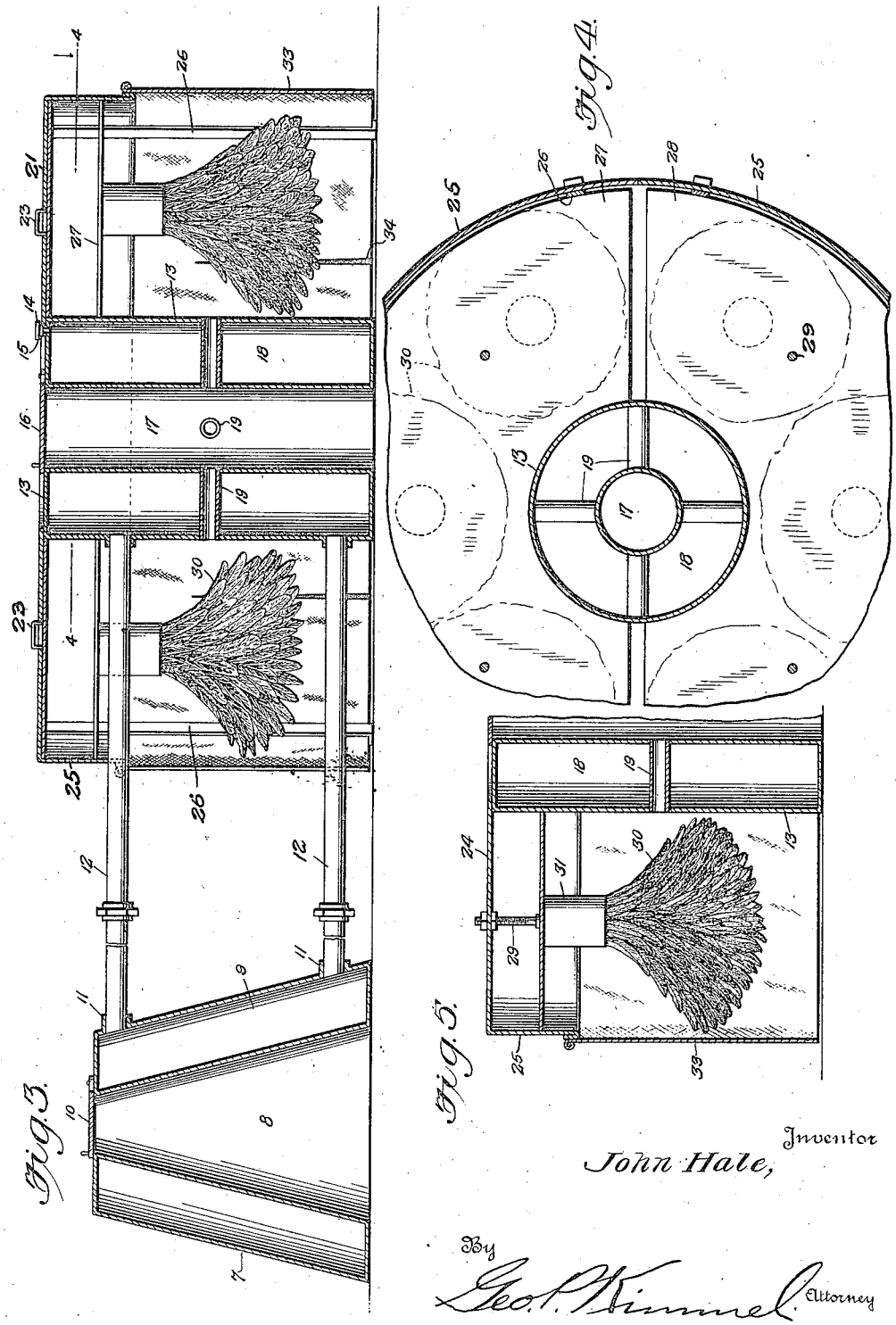

Patented July 17, 1923.

1,462,336

UNITED STATES PATENT OFFICE.

JOHN HALE, OF REEDSVILLE, WISCONSIN.

BROODER.

Application filed May 5, 1921. Serial No. 466,895.

*To all whom it may concern:*

Be it known that I, JOHN HALE, a citizen of the United States, residing at Reedsville, in the county of Manitowoc and State of Wisconsin, have invented certan new and useful Improvements in a Brooder, of which the following is a specification.

This invention relates to chicken brooders and more particularly to that class of hot water heated devices whereby heat may be generated and supplied to the brooder for a long duration of time.

The primary object of the invention resides in the novel and improved construction of a portable hot water heated brooder wherein the heated air may circulate in the hover causing a uniform temperature and thus avoid the crowding of the chicks in any particular portion of the hover as would take place under other conditions.

Another object of the invention consists in the construction of a hot water heated chicken brooder adapted to be heated from an external source as by an oil lamp, electric heater or their equivalent, including adjustable feather tufts which are adapted to be heated by the hot air generated, thus simulating the natural characteristics of a living fowl as closely as is artificially possible.

A still further object of the invention will be found to consist in my novel and improved brooder wherein the sectional hover may uniformly receive the heated air from a central tank, including an outside apron for confining the heat yet permitting ventilation and the escape of foul air.

A very important object of the invention also resides in the construction of a brooder of the type set forth which will be extremely simple in construction, consisting of comparatively few parts therefore inexpensive to manufacture, designed so as to be easily and conveniently assembled and maintained in operation for a long duration of time with very little care or attention, highly efficient in operation, practical and otherwise rendering very satisfactory service at a low cost.

With these objects in view and others which will be suggested and manifest as the purpose and nature of my invention are revealed in the following specification and drawing wherein I have shown a preferred embodiment thereof.

Figure 1 is a side view of my novel and improved brooder showing the heating means, Fig. 2 is a plan view thereof, Fig. 3 is a vertical sectional view through the brooder and heater, Fig. 4 is a view taken on the line 4—4 of Fig. 3, and, Fig. 5 is a detail sectional view of the adjustable feather tufts.

Referring now to the drawings wherein like parts designate corresponding parts throughout the specification, 5 designates the flooring of a chicken house for instance, the same being somewhat elevated from the ground or outside floor to permit the lamp designated in its entirety by numeral 6 to be placed under and removed from beneath the cone shaped water chamber 7 as clearly shown by Figs. 1 and 3 of the drawing. Heat generated from the lamp 6 within the central portion 8 of the water chamber will, of course, raise the temperature of the water in the compartment 9 and in order to control the rapidity of a rising temperature, I have provided a pivoted damper 10 on said water chamber for the obvious purpose. The said water tank is also provided with pipe receiving extensions 11 for the usual upper and lower conduits or pipes 12, leading to a central water compartment 13 which is provided with a filling aperture 14 and removable cover 15 to permit filling and replenishing of the water within the same, it being of course understood that upon the filling of the central water compartment the cone-shaped chamber above referred to, will also be filled with water, the cone shaped water tank being for this purpose of a less height than the central water tank, as suggested by the drawings.

Referring in particular to Figs. 3 and 4 of the drawing, it will be observed that the tank 13 is also provided with a pivoted damper or ventilator cover 16 above the central opening 17 of said tank, the water chamber 18 being provided with short transverse conduits 19 for conducting the heated air from the hover on opening the ventilator cover 16 to the atmosphere, the hover being hereinafter fully described.

The hover which is designed to confine the chicks, consists of a pair of complementary semi-circular members 20, 21, one of said members being slotted to fit over the U-shaped extensions 23 whereby the respective sections of the hover may be connected. The top portion 24 of each section is provided with a downwardly extending flange 25 to which a plurality of vertical supports 26 are soldered or otherwise fastened interiorly of the hover for supporting the same in upright position with respect to the central water tank.

Vertically adjustable within the flange portion 25 of the hover, I have provided a pair of semi-circular plates 27, 28 suspended and supported from the top 24 by adjustable screw threaded elements 29 whereby the feather tufts 30 arranged close together and entirely around the central water tank and the hover may be held in position by hollow, cylindrical holders 31 which are carried by the adjustable plates 27, 28 as clearly shown in Fig. 5 for instance. It will be readily understood that from time to time in the raising of chicks the feather tufts may be raised as the chicks grow larger until they are ready to be removed from the brooder. In order to confine the heat generated within the hover, I have also provided an apron 33 which is slitted, as at 34, at different places, which apron is secured by a string such as shown at 35 connected to the flange portion 25 of the hover and near the ends of the respective sections thus retaining the apron 33 in position as indicated by Fig. 3 of the drawing.

In the actual use and in practice, it will be clearly understood that the water tank 13 is filled and since the cone shaped water chamber 7 is of a less heighth than the same, water will enter the chamber 9 through the conduits 12, and permit the proper circulation. The hover is then placed about the central water tank 13 to receive the heated air which is generated and passes therefrom to said hover and the feather tufts are thus heated and are raised to the proper temperature. The dampers 10 and 16 to the respective water chambers, above referred to, may be opened to the desired degree to regulate the rapidity in the rise of temperature desired, it being of course understood that any suitable form of lamp for instance, may be utilized for heating the water in the compartment 9 of the cone shaped tank above described.

In the accompanying drawings, I have illustrated my invention embodied in one form by way of example, and which in practice has been found to be highly satisfactory in obtaining the desired results. It will be obvious however that other embodiments may be adopted and that various changes in the details of construction may be resorted to by those skilled in the art without departing from the spirit and scope of the invention. It is furthermore understood that the invention is not necessarily limited to the precise elements shown except in so far as such limitations are specified in the subject matter being claimed.

Having thus shown and described the invention, what I now claim as new and desire to secure by Letters Patent of the United States is:—

1. A brooder comprising a water container including a water space and a centrally disposed air passage, a cover pivoted to the container for controlling said passage, a pair of semi-circular head plates mounted on the container and each provided with a depending flange surrounding and spaced from said container and each further provided with vertical supports, a pair of semi-circular vertically movable suspension plates arranged below and adjustably connected to said head plates, tufts depending from said suspension plates, a slitted apron depending from said flanges and disposed concentrically with respect to said container and forming in connection with said head plates a hover, means to provide a hot water supply communicating with said container, and said container formed with cross pipes to provide for the circulation of air.

2. A brooder comprising a water container formed with an air passage and with cross pipes for the circulation of air therethrough, a hot water supply communicating with said container, a pair of suspension plates surrounding said container, a hover inclosing said plates and container, means connecting said plates to the hover, said means being vertically adjustable, and tufts carried by and depending from said plates.

3. A brooder comprising a water container formed with an air passage and with cross pipes for the circulation of air therethrough, a hot water supply communicating with said container, a pair of suspension plates surrounding said container, a hover inclosing said plates and container, means connecting said plates to the hover, said means being vertically adjustable, and tufts carried by and depending from said plates, said plates being independently shiftable vertically by said connecting means.

4. A brooder comprising a water container including a water space, a vertically disposed air passage and a series of radially extending air passages, said vertical passage surrounded by said water space and said radially extending passages leading from the vertical passage through the water space to provide for the circulation of air, a cover pivoted to the container for controlling said vertical passage, a hot water supply communicating with said water space, means mounted upon and surrounding said container to provide a hover, a pair of independently adjustable plates arranged within the hover, tufts depending from each of said plates, and adjustable suspension devices for each of said plates, said devices connected with said means.

5. An apparatus for the purpose set forth comprising a water container, means for supplying heat thereto, a central water container of greater height than the first mentioned water container, pipes leading from the latter to said central water container, a hover provided with a pair of complemental circular members, one of said members provided with extensions and the other with slots fitting over said extensions, vertically adjustable tufts depending from each of said members, and said central water container provided with a vertical air passage and intermediate cross pipes communicating with said passage to provide for the circulation of air.

In testimony whereof I affix my signature hereto.

JOHN HALE.